United States Patent
Yerli

(10) Patent No.: US 12,354,616 B2
(45) Date of Patent: *Jul. 8, 2025

(54) CROSS-LINGUAL VOICE CONVERSION SYSTEM AND METHOD

(71) Applicant: TMRW Groug IP, Luxembourg (LU)

(72) Inventor: Cevat Yerli, Dubai (AE)

(73) Assignee: TMRW Group IP, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,583

(22) Filed: Sep. 28, 2023

(65) Prior Publication Data

US 2024/0028843 A1 Jan. 25, 2024

Related U.S. Application Data

(63) Continuation of application No. 17/138,642, filed on Dec. 30, 2020, now Pat. No. 11,797,782.
(Continued)

(51) Int. Cl.
*G10L 21/003* (2013.01)
*G06F 40/58* (2020.01)
(Continued)

(52) U.S. Cl.
CPC ............ *G10L 21/003* (2013.01); *G06F 40/58* (2020.01); *G10L 13/00* (2013.01); *G10L 15/02* (2013.01); *G10L 15/063* (2013.01)

(58) Field of Classification Search
None
See application file for complete search history.

(56) References Cited

U.S. PATENT DOCUMENTS 8,930,183 B2 * 1/2015 Chun .................... G10L 21/007
  704/214
10,930,263 B1 * 2/2021 Mahyar ................. G06N 3/088
(Continued)

FOREIGN PATENT DOCUMENTS

CN 109147758 A 1/2019
CN 109671442 A 4/2019
(Continued)

OTHER PUBLICATIONS

Sündermann, David, and Hermann Ney. "An automatic segmentation and mapping approach for voice conversion parameter training." Proc. of the AST'03, Maribor, Slovenia (2003). (Year: 2003).*
(Continued)

*Primary Examiner* — Douglas Godbold
(74) *Attorney, Agent, or Firm* — BRYAN CAVE LEIGHTON PAISNER LLP

(57) ABSTRACT

A cross-lingual voice conversion system and method comprises a voice feature extractor configured to receive a first voice audio segment in a first language and a second voice audio segment in a second language, and extract, respectively, audio features comprising first-voice, speaker-dependent acoustic features and second-voice, speaker-independent linguistic features. One or more generators are configured to receive extracted features, and produce therefrom a third voice candidate keeping the first-voice, speaker-dependent acoustic features and the second-voice, speaker-independent linguistic features, wherein the third voice candidate speaks the second language. One or more discriminators are configured to compare the third voice candidate with the ground truth data, and provide results of the comparison back to the generator for refining the third voice candidate.

17 Claims, 9 Drawing Sheets

Related U.S. Application Data

(60) Provisional application No. 62/955,227, filed on Dec. 30, 2019.

(51) Int. Cl.
    *G10L 13/00*      (2006.01)
    *G10L 15/02*      (2006.01)
    *G10L 15/06*      (2013.01)

(56) References Cited

U.S. PATENT DOCUMENTS

| | | | | |
|---|---|---|---|---|
| 11,797,782 | B2* | 10/2023 | Yerli | G06F 40/58 |
| 2002/0009043 | A1* | 1/2002 | Ko | G11B 7/24 |
| 2012/0069974 | A1 | 3/2012 | Zhu et al. | |
| 2012/0173241 | A1 | 7/2012 | Li et al. | |
| 2012/0253794 | A1 | 10/2012 | Chun et al. | |
| 2015/0127349 | A1* | 5/2015 | Agiomyrgiannakis | G06F 40/58 |
| | | | | 704/266 |
| 2017/0040016 | A1* | 2/2017 | Cui | G10L 15/02 |
| 2018/0342256 | A1* | 11/2018 | Huffman | G10L 13/033 |
| 2018/0342257 | A1* | 11/2018 | Huffman | G10L 19/018 |
| 2019/0354592 | A1* | 11/2019 | Musham | G10L 13/00 |
| 2020/0058289 | A1* | 2/2020 | Gabryjelski | G06F 40/58 |
| 2020/0365166 | A1* | 11/2020 | Zhang | G06N 3/047 |
| 2020/0380952 | A1* | 12/2020 | Zhang | G10L 13/02 |
| 2020/0410976 | A1* | 12/2020 | Zhou | G06N 3/048 |
| 2022/0358905 | A1* | 11/2022 | Gupta | G06V 40/171 |
| 2022/0405492 | A1* | 12/2022 | Rathnam | G06F 40/58 |

FOREIGN PATENT DOCUMENTS

| | | |
|---|---|---|
| CN | 110060691 A | 7/2019 |
| CN | 110246488 A | 9/2019 |
| CN | 110459232 A | 11/2019 |
| CN | 110600046 A | 12/2019 |
| JP | 2009186820 A | 9/2009 |
| JP | 2019101391 A | 6/2019 |
| JP | 2019109306 A | 7/2019 |
| KR | 20190094315 A | 8/2019 |
| KR | 20190114938 A | 10/2019 |
| WO | 2019182346 A1 | 9/2019 |

OTHER PUBLICATIONS

Sundermann, David, Hermann Ney, and H. Hoge. "VTLN-based cross-language voice conversion." 2003 IEEE workshop on automatic speech recognition and understanding (IEEE Cat. No. 03EX721). IEEE, 2003. (Year: 2003).*

Extended European Search Report mailed on Jul. 27, 2021, EP Patent Application No. 20217111, 9 pages.

Saito, Y., et al., "Statistical Parametric Speech Synthesis Incorporating Generative Adversarial Networks", IEEE/ACM Transactions on Audio, Speech and Language Processing, vol. 26, No. 1, Jan. 2018, pp. 84-96.

Kiran Reddy, M., et al. "DNN-Based Cross Lingual Voice Conversion Using Bottleneck Features," Neural Processing Letters, Kluwer Academic Publishers, Norwell, MA vol. 51, No. 2, Nov. 7, 2019, p. 2029-2042.

Office Action mailed on Jul. 27, 2021, Indian Patent Application No. 202014056471, filed on Dec. 24, 2020, 6 pages.

Office Action mailed on Apr. 26, 2022, Japanese Patent Application No. JP2020215179 (Japanese version), 2 pages.

Lorenzo-Trueba, J., et al., "Can We Steal Your Voice Identity from the Internet?" Initial Investigation of Cloning Obama's Voice Using GAN Wavenet and low-quality found data, Odyssey 2018 the Speaker and Language Recognition Workshop, Jun. 26-29, 2018, Les Sables d'Olonne, France 8 pages.

Rallabandi, S.S. et al., An Approach to Cross-Lingual Voice Conversion, Jul. 19, 2019, 7 pages.

Fang, F., et al., "High-Quality Nonparallel Voice Conversion Based on Cycle-Consistent Adversarial Network," 2018 IEEE Intl., Conf. on Acoustics, Speech, Signal Processing (ICASSP) Calgary AB, Canada, Apr. 15-20, 2018, 5 pg.

Hsu, C., et al., "Voice Conversion from Unaligned Corpora Using Variational Autoencoding Wasserstein Generative Adversarial Networks," Interspeech 2017, Stockholm Sweden, Aug. 20-24, 2017, p. 3364-3368.

Kaneko, T., et al., "Parallel-Data-Tree Voice Conversion Using Cycle Consistent Adversarial Networks," ArXiv, 5 pg. Dec. 20, 2017.

Sisman, B., et al., "On the Study of Generative Adversarial Networks for Cross-Lingual Voice Conversion," 2019 IEEE Automatic Speech Recognition and Understanding Workshop (ASRU) Sentosa, Singapore, Dec. 14-18, 2019, 8 pages.

Tian, X., Voice Conversion with Parallel Non-Parallel Data and Synthetic Speech Detection Doctoral Thesis, Nanyang Tech University, Jurong West, Singapore, 2018, p. 1-116.

Zhu, J. et al., "Unpaired Image-to-Image Translation Using Cycle-Consisten Adversarial Networks," 2017 IEEE International Conference on Computer Vision (ICCV), Venice, Italy, Oct. 22-29, 2017, pp. 1-18.

Rallabandi, S.S. et al., "An Approach to Cross-Lingual Voice Conversion," Jul. 19, 2019, 7 page.

* cited by examiner

CROSS-LINGUAL VOICE CONVERSION SYSTEM AND METHOD

CROSS-REFERENCE TO RELATED APPLICATION

This application is a Continuation Application of U.S. patent application Ser. No. 17/138,642, filed on Dec. 30, 2020, now allowed, which claims the benefit of U.S. Provisional Application No. 62/955,227, filed on Dec. 30, 2019, which is incorporated by reference herein in their entirety.

BACKGROUND

Media productions including voice, e.g., applications, movies, audio-books and games are typically created with original performers acting out scripted performances. The voices are often translated through the help of "voice actors" into different languages. Many audiences need to resort to alternative voice actors for different languages as the original actors cannot normally speak all of the languages where these productions are made available.

Voice conversion (VC) converts one speaker's voice to sound like that of another. More specifically, most current VC techniques focus on making a source speaker sound like a target speaker, which involves performing a spectral feature mapping of both source and target speakers. Most of the existing VC techniques are designed for mono-lingual VC, meaning that the language of the source and target speakers is the same. Cross-lingual VC can be more challenging than mono-lingual VC because parallel data (i.e., data comprising the same speech content in both languages) is not always available in practice. Therefore, cross-lingual VC techniques that can work with non-parallel data may be used for a cross-lingual VC that could be used in media production translations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure relates generally to voice conversion, and more specifically relates to a method and system enabling cross-lingual voice conversion with non-parallel data.

In accordance with embodiments of the current disclosure, a method of cross-lingual voice conversion performed by a machine learning system (e.g., a generative adversarial network (GAN) system) comprises receiving, by a voice feature extractor, a first voice audio segment in a first language and a second voice audio segment in a second language. The method extracts, through the voice feature extractor respectively from the first voice audio segment and second voice audio segment, audio features comprising first-voice, speaker-dependent acoustic features and second-voice, speaker-independent linguistic features. The method generates through one or more generators from the trained data set a third voice candidate having the first-voice, speaker-dependent acoustic features and the second-voice, speaker-independent linguistic features, wherein the third voice candidate speaks the second language. The method proceeds by one or more discriminators comparing the third voice candidate with the ground truth data comprising the first-voice, speaker-dependent acoustic features and second-voice, speaker-independent linguistic features. The system provides results of the comparing step back to the generator for refining the third voice candidate.

In an embodiment, the one or more discriminators determine whether there is at least one inconsistency between the third voice candidate and the first-voice, speaker-dependent acoustic features and second-voice, speaker-independent linguistic features. In such an embodiment, when the at least one inconsistency exists, the system produces information relating to the consistency loss between the third voice candidate and the first-voice, speaker-dependent acoustic features and second-voice, speaker-independent linguistic features.

In some embodiments, the extracted speaker-dependent acoustic features refer to voices features that characterize the actual sound of a speaker's voice and enable listeners to distinguish between speakers speaking the same words at the same pitch, accent, amplitude and cadence. In further embodiments, the speaker-dependent acoustic features comprise segmental features, which are short-term features (e.g., features that can be determined from short audio segments) related to vocal tract characteristics, such as timbre, resonance, spectral envelope, and average pitch intensity. The speaker-independent linguistic features may comprise supra-segmental features related to acoustic properties of the domain over more than one segment, and relate to features such as pitch contour, duration of words, rhythm, articulation, syllables, phonemes, intonation contours, or stress patterns. These supra-segmental features may have a high correlation with linguistic features characteristic of a specific language or dialect, such as features that define the accent of a language or dialect.

In some embodiments, the method further comprises generating a plurality of third voice candidates, each third voice candidate comprising a different level of first-voice, speaker dependent acoustic features and second-voice, speaker independent linguistic features. In such embodiments, the system may use the plurality of generated third voice candidates in the generation of a plurality of dubbed version audio files comprising different levels of the first-voice, speaker-dependent acoustic features and second-voice, speaker-independent linguistic features.

The GAN can be described as a competitive or adversarial neural network-based system. In some embodiments, the GAN is a deep neural network (DNN) system. The GAN may include, for example, a Variational Autoencoding Wasserstein GAN (VAW-GAN) system or a Cycle-Consistent GAN (CycleGAN) system. The machine learning system may use the aforementioned, or other similar machine learning-based network systems for training based on data sets from the first and second voices to generate one or more third voice candidates as part of the learned output.

In embodiments where CycleGAN is used, training of the CycleGAN system comprises simultaneously learning forward and inverse mapping functions using at least adversarial loss and cycle-consistency loss functions.

In an embodiment, the forward mapping function receives, by the feature extractor, a first voice audio segment in the first language, and proceeds by extracting, by the feature extractor, the first-voice, speaker-dependent acoustic features. The forward mapping function proceeds by sending the first-voice, speaker-dependent acoustic features to a first-to-third speaker generator that is part of a first generator. Subsequently, the forward mapping function continues by receiving, by the first-to-third speaker generator, second-voice, speaker-independent linguistic features from the inverse mapping function. The forward mapping function generates, via the first-to-third speaker generator, a third voice candidate using the first-voice, speaker-dependent acoustic features and second-voice, speaker-independent linguistic features. The forward mapping function determines, by a first discriminator, whether there is a discrepancy between the third voice candidate and the first-voice, speaker-dependent acoustic features.

In an embodiment, the inverse mapping function comprises receiving, by the feature extractor, a second voice audio segment in the second language, and continues by extracting, by the feature extractor, the second-voice, speaker-independent linguistic features. The inverse mapping function continues by sending the second-voice, speaker-independent linguistic features to a second-to-third voice candidate generator, which may be part of a second generator module. The inverse mapping function receives, by the second-to-third voice candidate generator, first-voice, speaker-dependent acoustic features from the forward mapping function. The inverse mapping function continues by generating, by the second-to-third voice candidate generator, a third voice candidate using the second-voice, speaker-independent linguistic features and first-voice, speaker-dependent acoustic features. The inverse mapping function continues by determining, by a second discriminator, whether there is a discrepancy between the third voice candidate and the second-voice, speaker-independent linguistic features.

In an embodiment, when the first discriminator determines that the third voice candidate and the first-voice, speaker-dependent acoustic features are not consistent the first discriminator provides first inconsistency information back to the first-to-third voice candidate generator for refining the third voice candidate. The method continues by sending the third voice candidate to a third-to-first speaker generator that is part of the first generator, which utilizes the third voice candidate to generate converted first-voice, speaker-dependent acoustic features as part of the training phase employing the adversarial loss process, contributing to reducing the over-smoothing of the converted features. The converted first-voice, speaker-dependent acoustic features are then sent back to the first-to-third voice candidate generator for continuing the training process in order to further refine the third voice candidate. In an embodiment, when the third voice candidate is consistent with the first-voice, speaker-dependent acoustic features, then the forward mapping function may end.

In an embodiment, the second discriminator provides second inconsistency information back to the second-to-third voice candidate generator for refining the third voice candidate. The third voice candidate is then sent to a third-to-second speaker generator that is part of the second generator, which utilizes the third voice candidate to generate converted second-voice, speaker-independent linguistic features as part of the training phase employing the adversarial loss process, contributing to reducing the over-smoothing of the converted features. The converted second-voice, speaker-independent linguistic features are then sent back to the second-to-third voice candidate generator for continuing the training process in order to further refine the third voice candidate. In an embodiment, when the third voice candidate is consistent with the second-voice, speaker-independent acoustic features, then the inverse mapping function may end.

In some embodiments, the method further comprises selecting one or more of the plurality of third voices for use during voice translation. In yet further embodiments, the method continues by storing the selected one or more third voices in a database connected to the machine learning system, the database comprising a plurality of different trained third voices.

In some embodiments, the first voice is an original actor voice speaking the first language, and the second voice is a voice actor speaking the second language.

In yet further embodiments, the method is implemented during a movie voice translation enabling the selection of an original version, a dubbed version with the original actor voice, or a dubbed version with a voice actor voice. In these embodiments, the method further comprises using the plurality of generated third voices in the generation of a plurality of dubbed version audio files comprising different levels of the first-voice, speaker-dependent acoustic features and second-voice, speaker-independent linguistic features. In an embodiment, the method then selects the optimum dubbed version audio file.

In some embodiments, a machine learning system stored in memory of a server and being implemented by at least one processor comprises a voice feature extractor configured to receive a first voice audio segment in a first language and a second voice audio segment in a second language, and extract, respectively from the first and second voice audio segments, audio features comprising first-voice, speaker-dependent acoustic features and second-voice, speaker-independent linguistic features. The system further comprises a GAN comprising one or more generators configured to receive extracted features, and produce therefrom a third voice candidate having the first-voice, speaker-dependent acoustic features and the second-voice, speaker-independent linguistic features, wherein the third voice candidate speaks the second language. The GAN further comprises one or more discriminators configured to compare the third voice candidate with the ground truth data comprising the first-voice, speaker-dependent acoustic features and second-voice, speaker-independent linguistic features, and provide results of the comparing back to the generator for refining the third voice candidate.

In some embodiments, the system further comprises a database connected to the machine learning system and configured to store selected one or more third voices and comprising a plurality of different trained third voices.

In some embodiments, the system is configured for movie voice translation enabling the selection of an original version, a dubbed version with the original actor voice, or a dubbed version with a voice actor voice. Yet further embodiments, the machine learning system is further configured to use the plurality of generated third voices in the generation of a plurality of dubbed version audio files comprising different levels of the first-voice, speaker-dependent acoustic features and second-voice, speaker-independent linguistic features. The system may be further configured to select a dubbed version audio file, such as an optimum dubbed version audio file.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

In some aspects of the current disclosure, a cross-lingual voice conversion system with non-parallel data enables a real-time or near-real-time conversion and translation of speech by combining sound features of a first voice in a first language and a second voice in a second language to generate third voice candidates in the second language. The generated third voice candidates comprise speaker-dependent acoustic features of the first voice and speaker-independent linguistic features of the second voice, so that the third voice candidates sound as if the first voice is speaking the second language while keeping linguistic features typical of the second language. To those ends, the system comprises a machine learning system (e.g., a Deep Neural Network (DNN) system, or a competitive or adversarial neural network-based system, such as a Generative Adversarial Network (GAN) system) which is trained with a plurality of voice samples from each of the speakers before being ready to generate a third voice candidate for usage in real-time or near real-time cross-lingual speech conversion. The cross-lingual voice conversion system is configured to extract sound features from each of the voices and apply them during training of the machine learning system for the generation of third voice candidates.

In embodiments using GAN systems, some advantages of said systems include not relying on bilingual data and their alignment, nor on any external process, such as automatic speech recognition (ASR). In these embodiments, the GAN system can also be trained with limited amount of non-parallel training data of any two languages. In some embodiments, the objective function optimized by GANs results in the generation of artificial data that is indistinguishable from the real, or ground truth data. Parallel data is data comprising utterances containing the same linguistic content in both languages, which is usually difficult to collect, while non-parallel data is data comprising utterances containing different linguistic content in both languages.

Figure 1A:
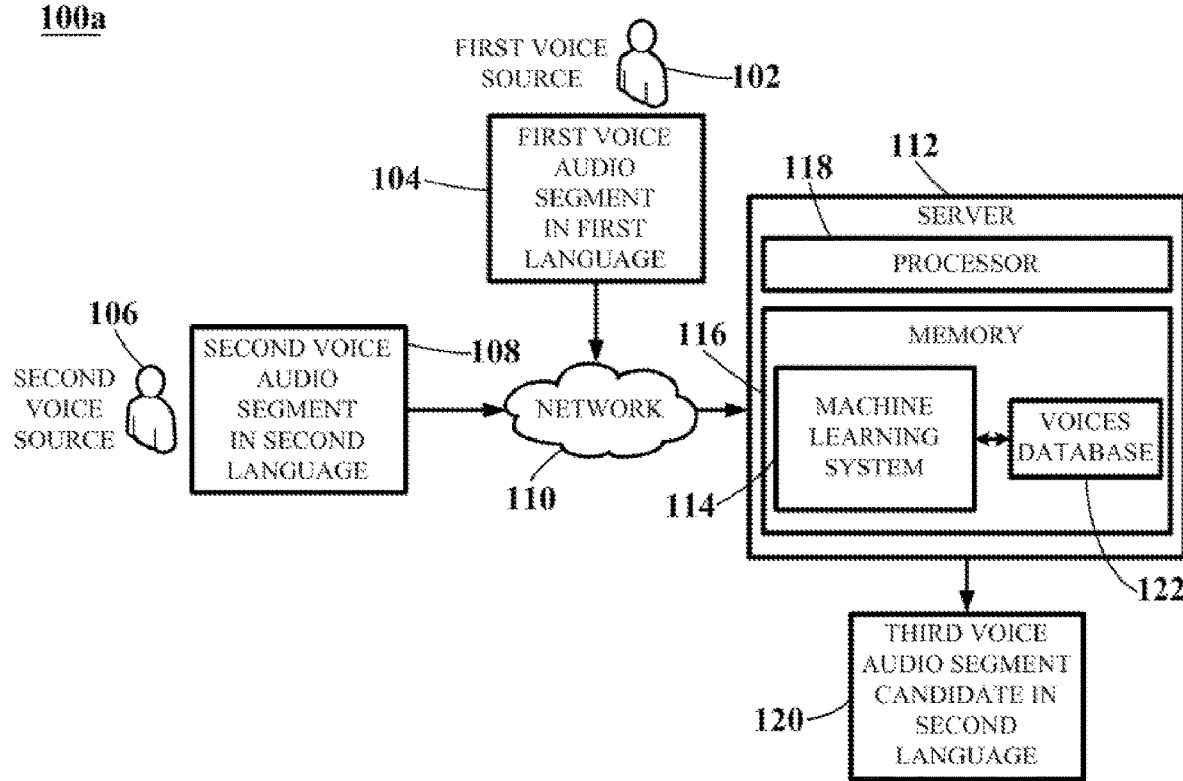
FIG. 1A depicts a schematic representation of a system enabling cross-lingual voice conversion with non-parallel data, according to an embodiment.

FIG. 1A depicts a schematic representation of a cross-lingual voice conversion system 100a with non-parallel data, according to an embodiment.

FIG. 1A depicts a first voice source 102 producing a first voice audio segment 104 in a first language and a second voice source 106 producing a second voice audio segment 108 in a second language. The first voice audio segment 104 and second voice audio segment 108 are sent via a network 110, such as the Internet, to a server 112 storing a machine learning system 114 in memory 116. The server 112 further comprises at least one processor 118 configured to process the data comprised in the first and second audio segments 104-106 with instructions comprised in the machine learning system 114. The at least one processor 118 executes computer code comprised in the machine learning system 114 to generate at least one third voice candidate 120 in the second language. Although examples are described herein with reference to a single server for ease of illustration, it should be understood that any functionality described herein as being provided by a server may be provided by a server computer system comprising one or more server computers.

In some embodiments, the first and second voice audio segments 104 and 108 are transferred to the machine learning system 114 via a user interface that users may access via electronic user devices (e.g., a computer such as a PC or mobile phone) connected to a network. The user devices may have an integrated or auxiliary microphone through which the users may record the voice segments. In other embodiments, the voice segments may be uploaded as pre-recorded digital files. In other embodiments, one or more of the audio segments are produced synthetically and thus do not need a human user to produce the audio signals recorded in the audio segments.

In some embodiments, the cross-lingual voice conversion system 100a further comprises a voices database 122 connected to the machine learning system 114. The voices database 122 is configured to store selected one or more third voice candidates and comprises a plurality of trained third voices. The system 100a may thus train the cross-lingual conversion system 114 with the first and second voice audio segments and generate a suitable amount of third voice audio segments in the second language 120, which may enable the selection of a third voice that is stored in the voices database 122 for future use during voice conversion and translation. These selected third voices can be used for a plurality of applications, such as for media production that may require voice translation and conversion, including for films, audio-books, games and other applications.

Figure 1B:
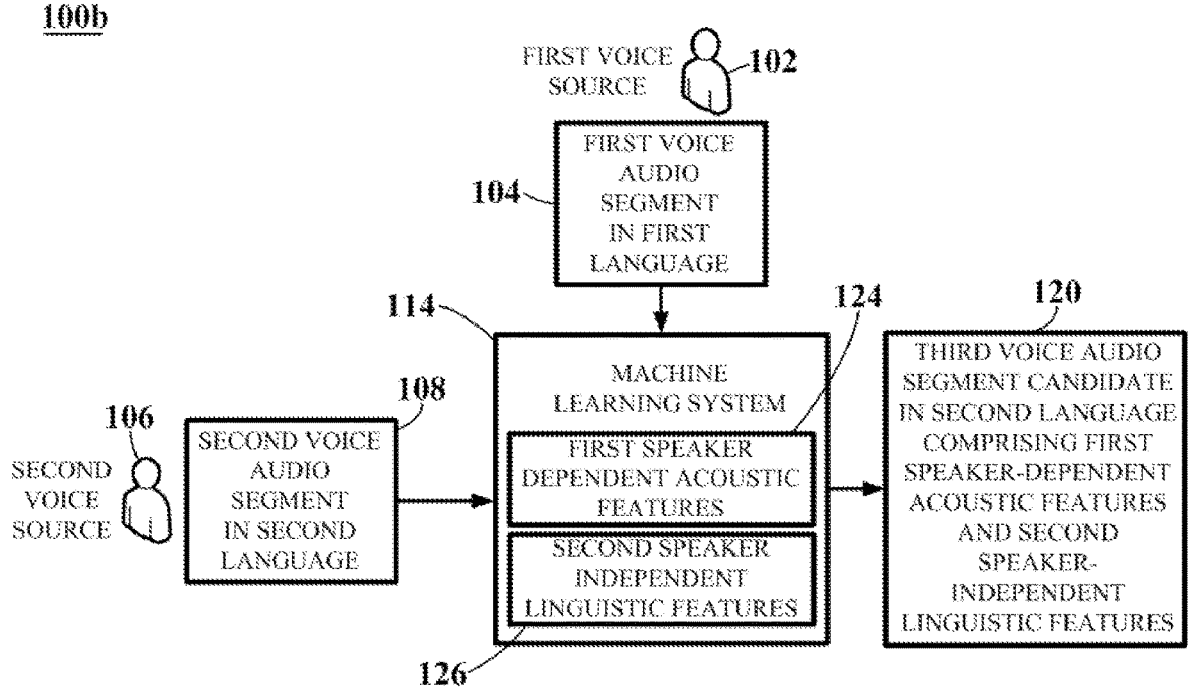
FIG. 1B depicts another embodiment of the system enabling cross-lingual voice conversion with non-parallel data.

FIG. 1B depicts another embodiment of a cross-lingual conversion system 100b with non-parallel data. The cross-lingual conversion system 100b includes further details about the voice audio features from each of the voice audio segments 104 and 108. Thus, in the embodiment of FIG. 1B, the machine learning system 114 is configured to be trained for cross-lingual voice conversion with data comprising speaker-dependent acoustic features 124 extracted from the first audio segment 104, and speaker-independent linguistic features 126 extracted from the second voice audio segment 108. The cross-lingual conversion results in a third voice candidate 120 in the second language comprising speaker-dependent acoustic features and speaker-independent linguistic features.

The extracted speaker-dependent acoustic features 124 refer to voice features that characterize the actual sound of a speaker's voice and enable listeners to distinguish between speakers speaking the same words, e.g., at the same pitch, accent, amplitude and cadence. In some embodiments, the speaker-dependent acoustic features 124 comprise segmental features, which are short-term features (e.g., features that can be determined from short audio segments) related to vocal tract characteristics, such as timbre, resonance, spectral envelope, and average pitch intensity. The speaker-independent linguistic features 126 may comprise supra-segmental features related to acoustic properties of the domain over more than one segment, and relate to features such as pitch contour, duration of words, rhythm, articulation, syllables, phonemes, intonation contours, or stress patterns. These supra-segmental features may have a high correlation with linguistic features characteristic of a specific language or dialect, such as features that define the accent of a language or dialect.

By way of example, timbre may be considered a speaker-dependent acoustic feature 124, which is a physiological property resulting from the set of frequency components a speaker makes for a particular sound. Thus, for instance, the third voice candidate 120 may comprise, amongst others, the timbre of the first voice source 102 and the accent of the second voice source 106, while keeping the same linguistic content of the first voice audio segment in the first language 104 and undergoing a language conversion from the first to the second language.

In some embodiments, the machine learning system 114 is a neural network-based system, such as a deep neural network (DNN) system, or a competitive or adversarial neural network-based system, such as a generative adversarial network (GAN) system comprising, for example, a Variational Autoencoding Wasserstein GAN (VAW-GAN) system or a Cycle-Consistent GAN (CycleGAN) system. The machine learning system 114 may use the aforementioned, or other similar machine learning-based network systems for training based on data sets from the first and second voices to generate one or more third voice candidates as part of the learned output.

Figure 2:
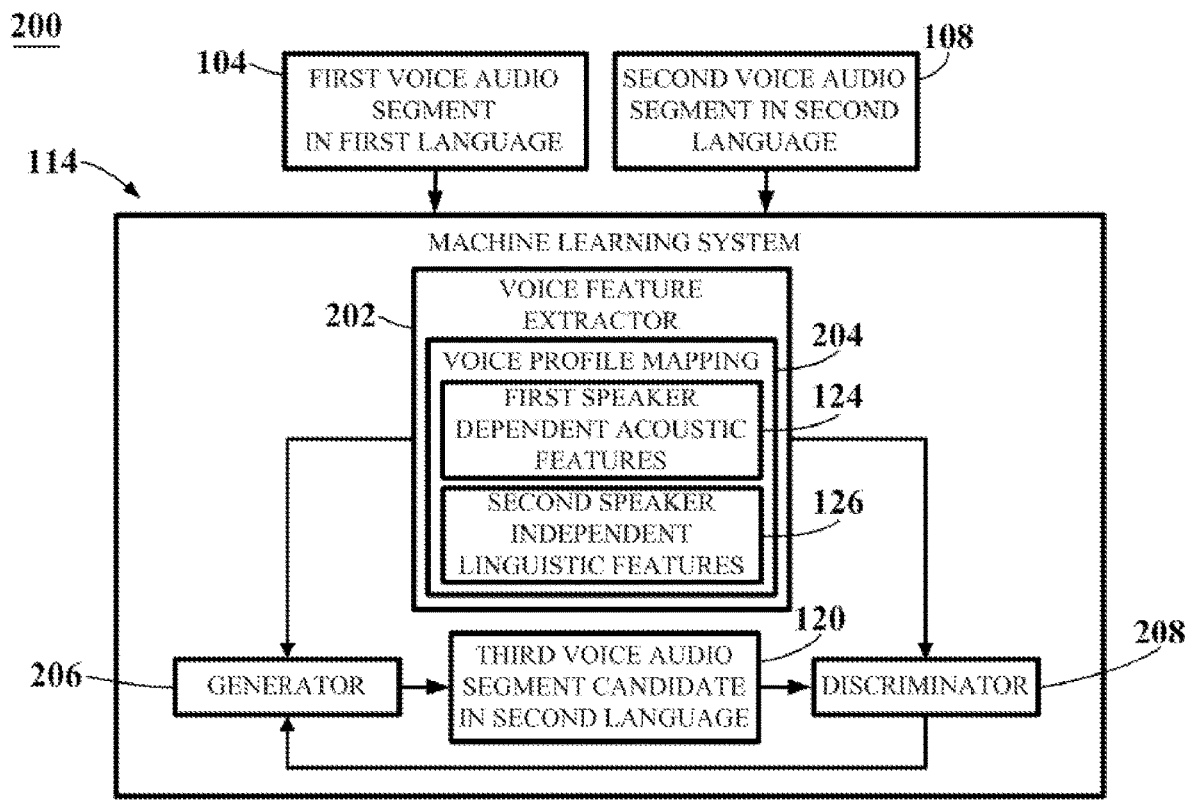
FIG. 2 depicts a schematic representation of a system enabling cross-lingual voice conversion with non-parallel data using a Variational Autoencoding Wasserstein GAN (VAW-GAN) algorithm, according to an embodiment.

FIG. 2 depicts another embodiment of a cross-lingual conversion system 200, employing a Variational Autoencoding Wasserstein GAN (VAW-GAN) cross-lingual conversion system with non-parallel data.

System 200 processes the first voice audio segment 104 in the first language and second voice audio segment 108 in the second language, which are sent to the machine learning system 114.

The machine learning system 114 may be configured to be trained with utterances produced from both the first and second voice sources, such that a third voice audio segment 120 in the second language may be generated. As disclosed, the training algorithm used in the machine learning system 114 of FIG. 2 may be, for example, a VAW-GAN algorithm, which does not require aligned parallel corpus during training.

In the example shown in FIG. 2, the machine learning system 114 comprises a voice feature extractor 202 configured to make a voice profile mapping 204 in order to map a representation of both the first and second voice audio segments 104 and 108 and extract frequency components associated with each sound made by each voice. The function of the voice feature extractor 202 is similar to that of an encoder or phone recognizer. The voice feature extractor 202 may thus extract relationships between amplitude in the frequencies of the first and second voice audio segments 104 and 108 to learn the voice features pertaining to each and enabling an accurate voice mapping. Such an extraction may involve extracting, in particular, spectral features, pitch (fundamental frequency (f0)), energy, aperiodicity-related parameters, and the like. For example, voices may be mapped in a vector space relative to one another on the basis of extracted frequency components, which enables extrapolation of synthetic frequency components for sounds not provided in the voice audio segments. Further details relating to mapping voices in a vector space are disclosed in U.S. Patent Publication No. 2018/0342256, which is incorporated herein by reference.

Mapping a representation of the first and second voice audio segments 104 and 108 is performed to separate speaker-dependent acoustic features 124 from speaker-independent linguistic features 126 of each of the first and second voice audio segments 108 and 104. The voice feature extractor 202 thus extracts these voice features from the frequency components for training the machine learning system 114 in a way that a third voice candidate 120 may be generated comprising the first-voice, speaker-dependent acoustic features 124 and the second-voice, speaker-independent linguistic features 126.

In some embodiments, the machine learning system 114 filters the first voice audio segment in the first language 104 and the second voice audio segment in the second language 108 into analytical audio segments using, for example, a temporal receptive filter. In these embodiments, the voice feature extractor 202 extracts the frequency components from the analytical audio segments for a subsequent mapping of a representation of each voice in a vector space.

The machine learning system 114 further comprises at least one generator 206 and at least one discriminator 208, which are two neural networks that are trained together in a GAN system. The generator 206 estimates the mapping function between the first-voice, speaker-dependent acoustic features 124 and second-voice, speaker-independent linguistic features 126 comprised respectively in the first and second audio segments 104 and 108, and uses the data to generate a third voice candidate 120 that is sent to the discriminator 208. The generator 206 acts as a decoder or synthesizer. The discriminator 208 acts as a binary classifier that accepts the ground truth data coming from the voice feature extractor 202 comprising the originally-generated first-voice, speaker-dependent acoustic features 124 and second-voice, speaker-independent linguistic features 126 and compares the ground truth data with the synthetically generated third voice candidates 120 produced by the generator 206. The discriminator 208 further determines whether there is at least one inconsistency between the third voice candidate 120, the first-voice, speaker-dependent acoustic features 124 and second-voice, speaker-independent linguistic features 126. In an embodiment, when the at least one inconsistency exists, the discriminator 208 produces inconsistency information relating to the consistency loss between the third voice candidate 120, the first-voice, speaker-dependent acoustic features 124 and second-voice, speaker-independent linguistic features 126. Finally, the discriminator 208 provides the inconsistency information back to the generator 206 for refining the third voice candidate 120.

In some embodiments, the machine learning system 114 is configured to generate a plurality of third voice candidates 120, each comprising a different level of speaker-dependent acoustic features 124 and speaker-independent linguistic features 126. For example, each of the third voice candidates 120 may display a variation in timbre or have a thicker/lighter accent, which may provide a human or a software program with various options for selecting an optimum third voice. In yet further embodiments, the machine learning system 114 is further configured to select one or more of the plurality of third voice candidates 120 for use during voice translation. In yet further embodiments, the machine learning system 114 is further configured to store the selected one or more third voices in a database (e.g., voices database 122 of FIG. 1A) connected to the machine learning system 114, the database comprising a plurality of trained GAN neural networks corresponding to selected third voices.

Figure 3A:
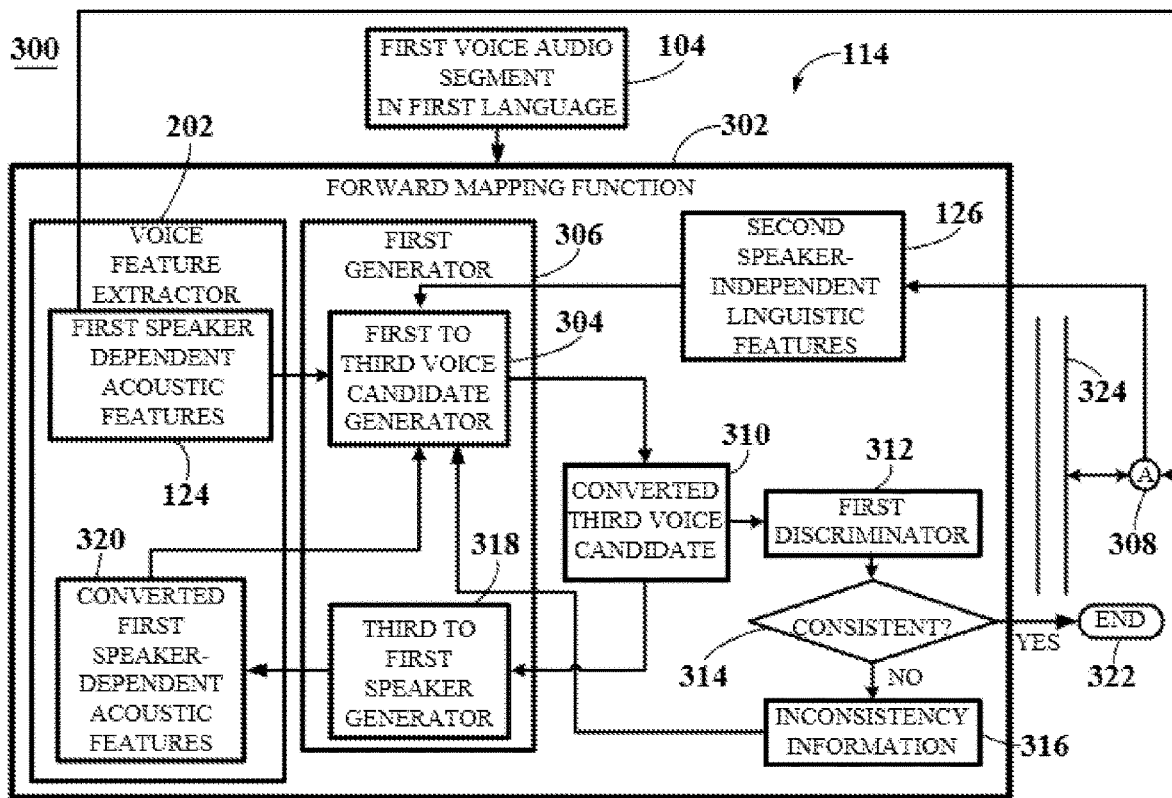
FIG. 3A depicts a schematic representation of a forward mapping function using a Cycle-Consistent GAN (Cycle-GAN) algorithm, according to an embodiment.
Figure 3B:
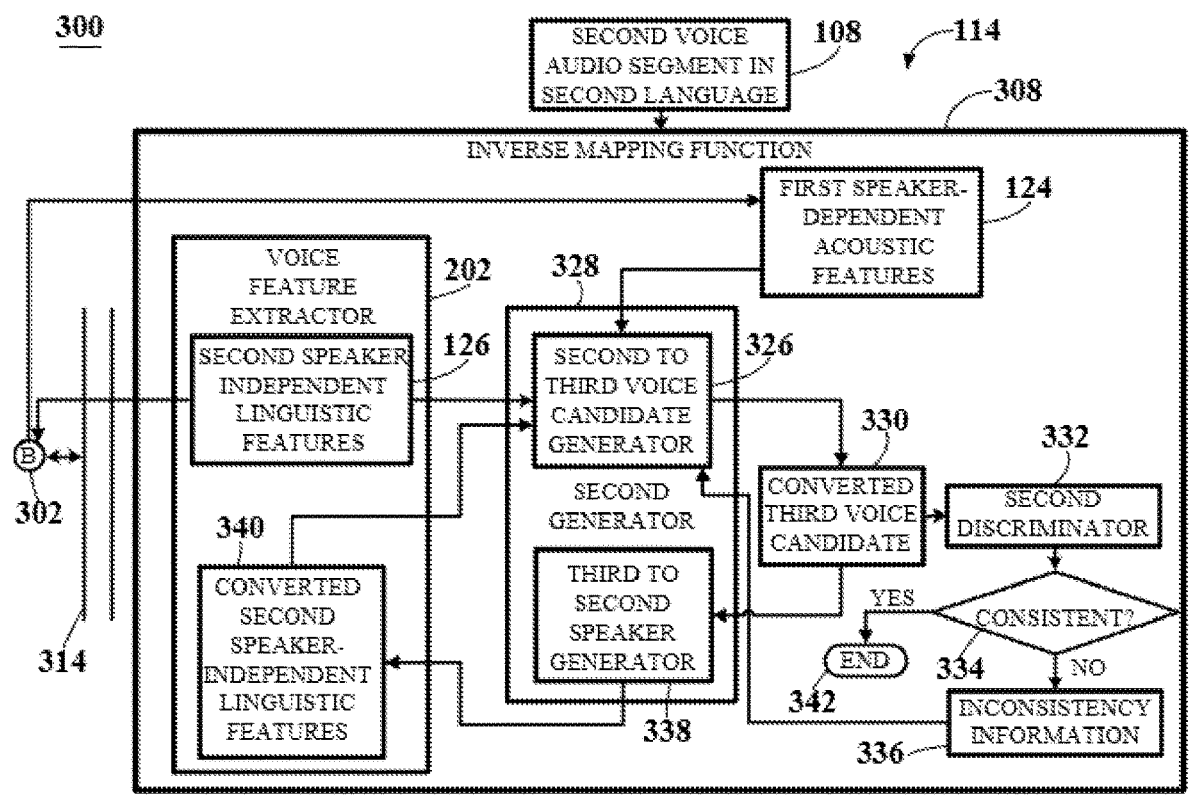
FIG. 3B depicts a schematic representation of an inverse mapping function using a Cycle-Consistent GAN (Cycle-GAN) algorithm, according to an embodiment.

FIGS. 3A-3B depict embodiments of a cross-lingual conversion system 300, employing a Cycle-Consistent GAN (CycleGAN) algorithm, which comprises simultaneously learning forward and inverse mapping functions using at least adversarial loss and cycle-consistency loss functions. The adversarial loss is used to make the distribution of the generated data (e.g., a generated third voice candidate), and that of the real target data (e.g., the real speaker-dependent acoustic features and speaker-independent linguistic features), indistinguishable. The cycle-consistency loss, on the other hand, can be introduced to constrain part of the input information so that the input information is invariant when processed throughout the network. This enables finding an optimal pseudo pair from unpaired cross-lingual data. Furthermore, the adversarial loss contributes to reducing over-smoothing of the converted feature sequence. CycleGAN is known to achieve remarkable results on several tasks where paired training data does not exist. In some embodiments, an identity-mapping loss may also be considered during the CycleGAN training, which provides help for preserving the identity-related features of each of the first and second voice audio segments that are to be used in the converted third candidate. By combining these losses, a model can be learned from unpaired training samples, and the learned mappings are able to map an input to a desired output.

FIG. 3A depicts a schematic representation of a forward mapping function 302 using a CycleGAN algorithm 300 that may be employed in a machine learning system 114, according to an embodiment. The forward mapping function 302 receives, from the feature extractor 202, a first voice audio segment in the first language 102, and proceeds by extracting, by the voice feature extractor 202, the first-voice, speaker-dependent acoustic features 124. As the first-voice, speaker-dependent acoustic features 124 are extracted directly from the first voice audio segment in the first language 102, these features are also referred to herein as ground truth first-voice, speaker-dependent acoustic features 124 to differentiate them from the created first-voice, speaker-dependent acoustic features generated later in the process.

The forward mapping function 302 proceeds by sending the ground truth first-voice, speaker-dependent acoustic features 124 to a first-to-third voice candidate generator 304 that is part of a first generator 306. The forward mapping function 302 then receives, by the first-to-third voice candidate generator 304, ground truth second-voice, speaker-independent linguistic features 126 extracted from the inverse mapping function 308 A. Then, the forward mapping function 302 generates, via the first-to-third voice candidate generator 304, a third voice candidate 310 in the second language using the ground truth first-voice, speaker-dependent acoustic features 124 extracted from the first voice audio segment 104 in the first language, and the ground truth second-voice, speaker-independent acoustic features 126 received from the inverse mapping function 308 A. Thus, the created first-voice, speaker-dependent acoustic features comprised in the third voice candidate 310 along with the linguistic content comprised in the first voice audio segment in the first language 104 should be indistinguishable from the ground truth speaker-dependent acoustic features 124, but with the difference that the third voice candidate 310 comprises the second-voice, speaker-independent linguistic feature 126 characteristic of the second language, and that the resulting message is translated to the second language.

The forward mapping function 302, through a first discriminator 312, makes a determination 314 of whether there is an inconsistency between the created first-voice, speaker-dependent acoustic features comprised in the third voice candidate 310 and the ground truth first-voice, speaker-dependent acoustic features 124, in which case the first discriminator 312 produces inconsistency information 316 relating to the consistency loss. The first discriminator 312 provides the inconsistency information 316 back to the first-to-third voice candidate generator 304 for refining the third voice candidate 310.

The third voice candidate 308 is then sent to a third-to-first speaker generator 318 that is part of the first generator 306, which utilizes the third voice candidate 310 to generate converted first-voice, speaker-dependent acoustic features 320 as part of the training phase employing the adversarial loss process, which contributes to reducing the over-smoothing of the converted features. The converted first-voice, speaker-dependent acoustic features 320 are then sent back to the first-to-third voice candidate generator 304 for continuing the training process in order to further refine the third voice candidate 310. When the third voice candidate 310 is consistent with the first-voice, speaker-dependent acoustic features 124, then the forward mapping function 302 may end 322.

The forward mapping function 302 is performed in parallel with the inverse mapping function 308, which is represented by the parallel lines 324 illustrated in FIG. 3A.

FIG. 3B depicts a schematic representation of an inverse mapping function 310 using a Cycle-Consistent GAN (CycleGAN) algorithm, according to an embodiment.

The inverse mapping function 308 receives, from the feature extractor 202, a second voice audio segment in the second language 108, and proceeds by extracting, by the voice feature extractor 202, the second-voice, speaker-independent linguistic features 126. As the second-voice, speaker-independent linguistic features 126 are extracted directly from the second voice audio segment in the second language 104, these features are also referred to herein as ground truth second-voice, speaker-independent linguistic features 126 to differentiate them from the created second-voice, speaker-independent linguistic features generated later in the process.

The inverse mapping function 308 proceeds by sending the ground truth second-voice, speaker-independent linguistic features 126 to a second-to-third voice candidate generator 326 that is part of a second generator 328. The inverse mapping function 308 then receives, by the second-to-third voice candidate generator 326, ground truth first-voice, speaker-dependent acoustic features 124 from the forward mapping function 302 B. Then, the inverse mapping function 308 generates, via the second-to-third voice candidate generator 326, a third voice candidate 330 in the second language using the ground truth second-voice, speaker-independent acoustic features 126 extracted from the second voice audio segment 108 in the second language and the ground truth first-voice, speaker-dependent acoustic features 124 received from the forward mapping function 302 A. Thus, the created second-voice, speaker-independent linguistic features comprised in the third voice candidate 330 along should be indistinguishable from the ground truth second-voice, speaker-independent linguistic features 126, but with the difference that the third voice candidate 330 comprises the first-voice, speaker-dependent acoustic features 124 characteristic of the first voice audio segment in the first language 104, conveys the original linguistic content of the message generated by the first voice audio segment in the first language 104, and that the resulting message is translated to the second language.

The inverse mapping function 308, through a second discriminator 332, makes a determination 334 of whether there is an inconsistency between the created second-voice, speaker-independent linguistic features comprised in the third voice candidate 330 and the ground truth second-voice, speaker-independent acoustic features 126, in which case the second discriminator 332 produces inconsistency information 336 relating to the consistency loss. The second discriminator 332 provides the inconsistency information 336 back to the second-to-third voice candidate generator 326 for refining the third voice candidate 330.

The third voice candidate 330 is then sent to a third-to-second speaker generator 338 that is part of the second generator 328, which utilizes the third voice candidate 330 to generate converted second-voice, speaker-independent linguistic features 340 as part of the training phase employing the adversarial loss process, contributing to reducing the over-smoothing of the converted features. The converted second-voice, speaker-independent linguistic features 340 are then sent back to the second-to-third voice candidate generator 326 for continuing the training process in order to further refine the third voice candidate 330. When the third voice candidate 330 is consistent with the second-voice, speaker-independent acoustic features 126, then the inverse mapping function 308 may end 342.

Figure 4:
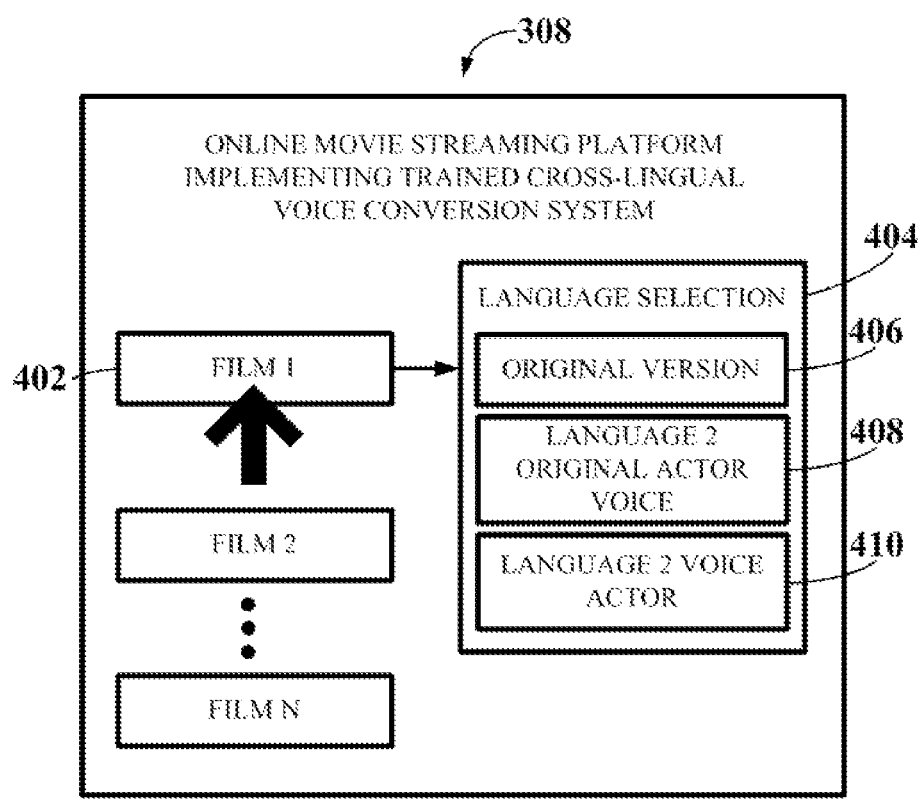
FIG. 4 depicts a schematic representation of a sample online movie streaming platform implementing a trained cross-lingual voice conversion system, according to an embodiment.

FIG. 4 depicts a schematic representation of a sample online movie streaming platform 400 implementing a trained cross-lingual voice conversion system, according to an embodiment.

The online movie streaming platform 400 enables a user to select a film 402 comprising a language menu 404 enabling selection of various options, such as having the audio of the film 402 in an original version 406; a dubbed version in a second language with the original actor voice 408; and a dubbed version in the second language with a voice actor 410. A first voice audio produced from an original voice actor speaking the first language may be used for the original version 406, and a second voice audio may be produced from a voice actor speaking the second language for the language selection option 404 including the second language with the voice actor 410. The translation of the original audio into the second language and conversion of features between a first and a second speaker involve the implementation of the cross-lingual voice conversion system of the current disclosure for enabling the dubbed version in the second language with a voice actor 410, such as through systems illustrated in systems 100*a*-300 of FIGS. 1A-3B.

Thus, the cross-lingual conversion systems of 100*a*-300 of FIGS. 1A-3B of the current disclosure may be configured to provide viewers with a movie version where the original actor's voice is translated into a desired language. By way of example, and making reference to FIG. 1B, the original actor's voice conveys the speaker-dependent acoustic features 124 along with linguistic content related to, for example, a movie script where the original actor plays a role; and a second voice audio segment 108 produced by the voice actor serves to train the machine learning system 114 with the voice actor's independent linguistic features 126. The combination of the speaker-dependent acoustic features 124 and speaker-independent linguistic features 126 generates one or more third voice candidates that, after sufficient rounds of training and refining, may be used as a selected third voice candidate 120 in the second language to serve as the dubbed version with the original actor voice 408. In some embodiments, a plurality of generated third voices may be used in the generation of a plurality of dubbed version audio files comprising different levels of the first-voice, speaker-dependent acoustic features and second-voice, speaker-independent linguistic features, enabling a wide array of options to select an optimum dubbed version audio file. The selection may be performed manually by a human (e.g., a system administrator) or automatically by computer code (e.g., an artificial intelligence program).

Figure 5:
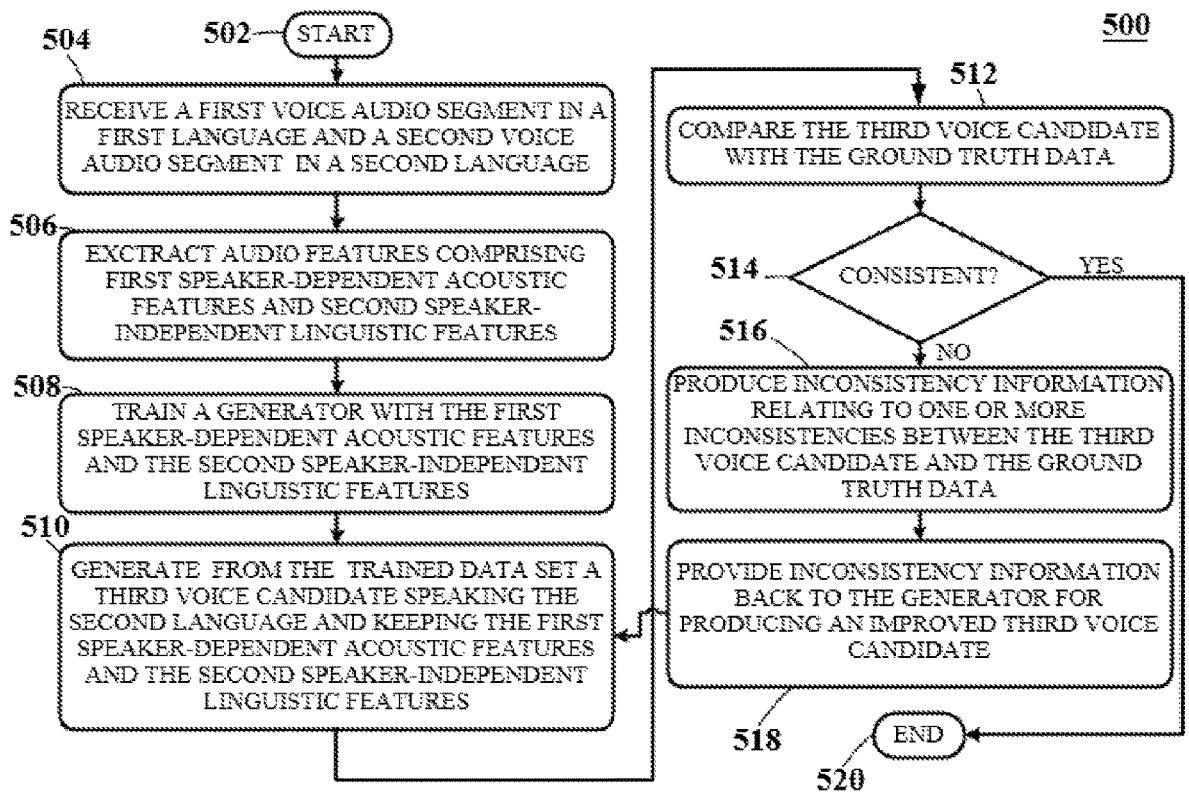
FIG. 5 depicts a schematic representation of a method enabling cross-lingual voice conversion with non-parallel data, according to an embodiment.

FIG. 5 depicts a schematic representation of a method 500 enabling cross-lingual voice conversion with non-parallel data, according to an embodiment.

The method 500 begins in steps 502 and 504 by receiving, by a voice feature extractor, a first voice audio segment in a first language and a second voice audio segment in a second language. The method 500 proceeds in step 506 by extracting, through the voice feature extractor, respectively from the first voice audio segment in the first language and second voice audio segment in the second language, audio features comprising first-voice, speaker-dependent acoustic features and second-voice, speaker-independent linguistic features, herein referred to also as ground truth data to establish a difference with data generated synthetically by a generator in subsequent steps. In step 508, the method 500 trains the generator with the first-voice, speaker-independent acoustic features and the second-voice, speaker-independent linguistic features. In step 510, the method generates from the trained data set a third voice candidate keeping the first-voice, speaker dependent acoustic features and the second-voice, speaker-independent linguistic features, wherein the third voice candidate speaks the second language.

Subsequently, the method 500 proceeds in step 512 by one or more discriminators comparing the third voice candidate with the ground truth data comprising the first-voice, speaker-dependent acoustic features and second-voice, speaker-independent linguistic features. Through this comparison, the one or more discriminators determine in check 514 whether there is at least one inconsistency between the third voice candidate and the first-voice, speaker-dependent acoustic features and second-voice, speaker-independent linguistic features. When the at least one inconsistency exists, the discriminator produces, in step 516, inconsistency information relating to the consistency loss between the third voice candidate and the first-voice, speaker-dependent acoustic features and second-voice, speaker-independent linguistic features. In step 518, the discriminator provides the inconsistency information back to the generator for refining the third voice candidate, looping back to step 510. When the third voice candidate is consistent with the ground truth data comprising the first-voice, speaker-dependent acoustic features and second-voice, speaker-independent linguistic features, the method may end 520.

In some embodiments, the method 500 is implemented using a Variational Autoencoding Wasserstein GAN (VAW-GAN) algorithm.

Figure 6:
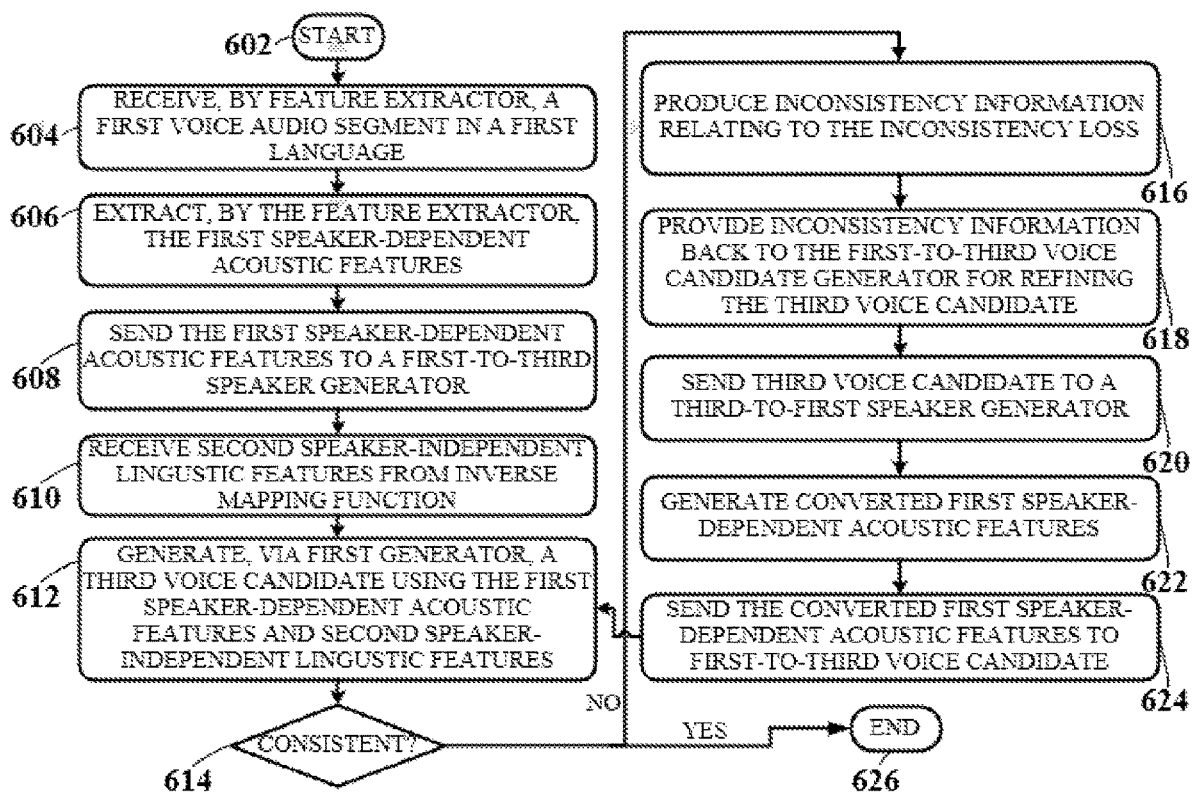
FIG. 6 depicts a schematic representation of a method describing a forward mapping function enabling cross-lingual voice conversion with non-parallel data by using a Cycle-Consistent GAN (CycleGAN) algorithm, according to an embodiment.

FIG. 6 depicts a schematic representation of a method 600 describing a forward mapping function enabling cross-lingual voice conversion with non-parallel data by using a Cycle-Consistent GAN (CycleGAN) algorithm, according to an embodiment. The forward mapping function is performed simultaneously with an inverse mapping function described in method 700 with reference to FIG. 7.

The forward mapping function of method 600 begins in steps 602 and 604 by receiving, by the feature extractor, a first voice audio segment in a first language, and proceeds in step 606 by extracting, by the feature extractor, the first-voice, speaker-dependent acoustic features. The forward mapping function proceeds in step 608 by sending the first-voice, speaker-dependent acoustic features to a first-to-third speaker generator that is part of a first generator. Subsequently, the forward mapping function continues in step 610 by receiving, by the first-to-third speaker generator, second-voice, speaker-independent linguistic features in a second language from the inverse mapping function. The first-voice, speaker-dependent acoustic features extracted from the first voice audio segment and the second-voice, speaker-independent linguistic features from the inverse mapping function are referred to herein as ground truth data to establish a difference with synthetically generated data by a generator in subsequent steps. Subsequently, the forward mapping function generates in step 612, via the first generator, a third voice candidate using the ground truth data comprising first-voice, speaker-dependent acoustic features and second-voice, speaker-independent linguistic features.

The forward mapping function determines in check 614, by a first discriminator, whether there is a discrepancy between the third voice candidate and the ground truth first-voice, speaker-dependent acoustic features, in which case the first discriminator produces, in step 616, inconsistency information relating to the consistency loss. In step 618, the first discriminator provides the inconsistency information back to the first-to-third voice candidate generator for refining the third voice candidate. The method continues in step 620 by the first discriminator sending the third voice candidate to a third-to-first speaker generator that is part of the first generator. The third-to-first speaker generator utilizes the third voice candidate to generate, in step 622, converted first-voice, speaker-dependent acoustic features as part of the training phase employing the adversarial loss process, contributing to reducing the over-smoothing of the converted features. The converted first-voice, speaker-dependent acoustic features are then sent back to the first-to-third voice candidate generator for continuing the training process in order to further refine the third voice candidate, as viewed in step 624, looping back to step 612. When the third voice candidate is consistent with the first-voice, speaker-dependent acoustic features, then the forward mapping function may end 626.

Figure 7:
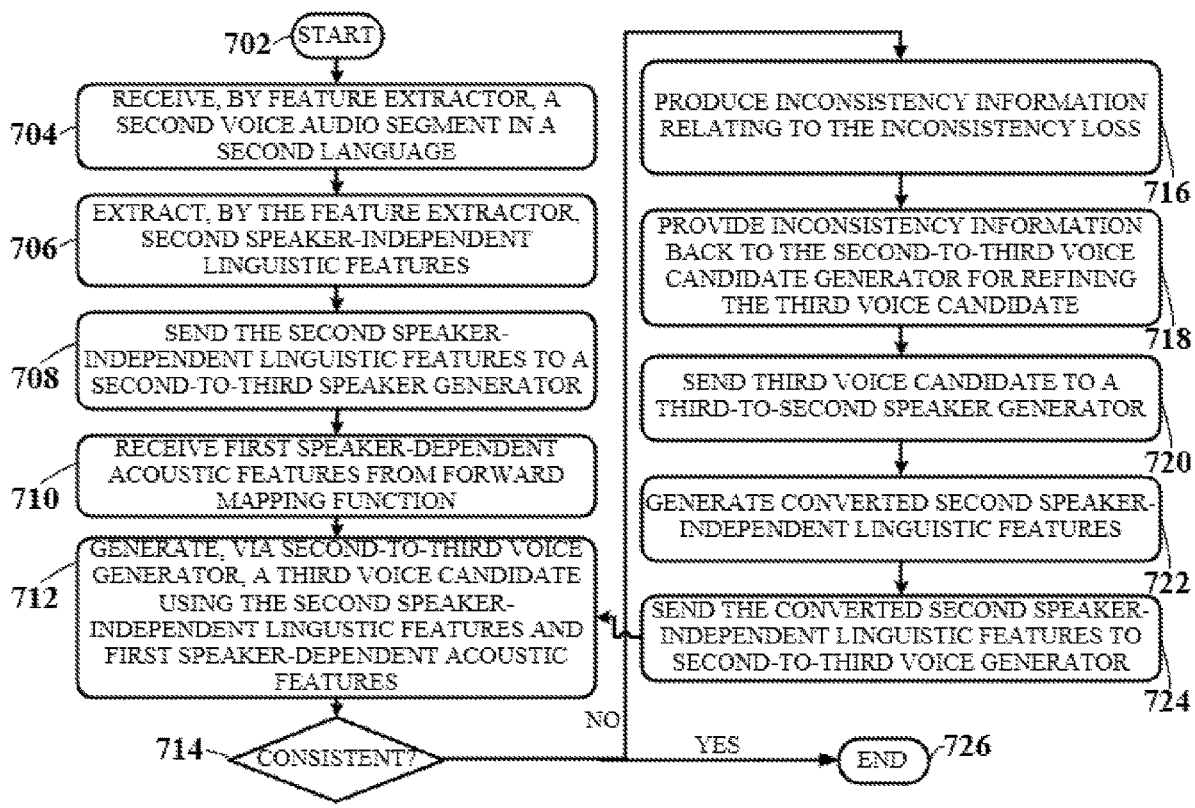
FIG. 7 depicts a schematic representation of a method describing an inverse mapping function enabling cross-lingual voice conversion with non-parallel data by using a Cycle-Consistent GAN (CycleGAN) algorithm, according to an embodiment.

FIG. 7 depicts a schematic representation of a method 700 describing an inverse mapping function enabling cross-lingual voice conversion with non-parallel data by using a CycleGAN algorithm, according to an embodiment. Both the forward mapping function of method 600 and the inverse mapping function of method 700 are performed simultaneously as part of the CycleGAN algorithm training.

The inverse mapping function of method 700 begins in steps 702 and 704 by receiving, by the feature extractor, a second voice audio segment in the second language, and continues in step 706 by extracting, by the feature extractor, the second-voice, speaker-independent linguistic features. Then, the inverse mapping function continues in step 708 by sending the second-voice, speaker-independent linguistic features to a second-to-third voice candidate generator that is part of a second generator. Subsequently, in step 710, the inverse mapping function receives, by the second-to-third voice candidate generator, first-voice, speaker-dependent acoustic features from the forward mapping function. The second-voice, speaker-independent linguistic features extracted from the second voice audio segment and the first-voice, speaker-dependent acoustic features from the forward mapping function are referred to herein as ground truth data to establish a difference with synthetically generated data by a generator in subsequent steps. The inverse mapping function continues in step 712 by generating, by the second-to-third voice candidate generator, a third voice candidate using the second-voice, speaker-dependent acoustic features and first-voice, speaker-dependent acoustic features.

The inverse mapping function continues in check 714 by determining, by a second discriminator, whether there is a discrepancy between the third voice candidate and the second-voice, speaker-independent linguistic features, in which case the second discriminator produces, in step 716, inconsistency information relating to the consistency loss. In step 718, the second discriminator provides the inconsistency information back to the second-to-third voice candidate generator for refining the third voice candidate. The third voice candidate is then sent, in step 720, to a third-to-second speaker generator that is part of the second generator. The third-to-second speaker generator utilizes the third voice candidate to generate, in step 722, converted second-voice, speaker-independent linguistic features as part of the training phase employing the adversarial loss process, contributing to reducing the over-smoothing of the converted features. The converted second-voice, speaker-independent linguistic features are then, in step 724, sent back to the second-to-third voice candidate generator for continuing the training process in order to further refine the third voice candidate, looping back to step 712. When the third voice candidate is consistent with the second-voice, speaker-independent acoustic features, then the inverse mapping function may end 726.

The machine learning system 114 illustrated in FIGS. 1A-3B and the various elements therein comprised (e.g., one or more voice feature extractors 202, generators 206 or discriminators 208), which enable the implementation of methods 500-700 of FIGS. 5-7, may be implemented by the at least one processor 118 using a plurality of microprocessors executing software or firmware, or may be implemented using one or more application specific integrated circuits (ASICs) and related software. In other examples, the machine learning system 114 and the various elements therein comprised, which enable the implementation of methods 500-700 of FIGS. 5-7, may be implemented using a combination of ASICs, discrete electronic components (e.g., transistors), and microprocessors. In some embodiments, the machine learning system 114 may be distributed across a plurality of different machines. In some embodiments, components shown as separate may be replaced by a single component. In addition, some of the components displayed may be additional, or may be replaced by other components.

Computer-readable media having stored thereon instructions configured to cause one or more computers to perform any of the methods described herein are also described. A computer readable medium may include volatile or nonvolatile, removable or nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A method comprising:
receiving a first voice audio segment and a second voice audio segment;
extracting a speaker-dependent acoustic feature from the first voice audio segment;
extracting a speaker-independent linguistic feature from the second voice audio;
generating a plurality of voice candidates with a machine learning system, wherein each of the plurality of voice candidates comprises a different level of the speaker-dependent acoustic feature of the first voice audio segment and a different level of the speaker-independent linguistic feature of the second voice audio segment; and
storing the voice candidates in a database connected to the machine learning system.

2. The method of claim 1 further comprising:
generating a third voice audio segment based on a voice candidate from the plurality of voice candidates,
wherein the first voice audio segment is in a first language and the second voice audio segment is in a second language, and
wherein the third voice audio segment is in the second language translated based on the first language.

3. The method of claim 1,
wherein the speaker-dependent acoustic feature is based on a segmental feature, and
wherein the speaker-independent linguistic feature is based on a supra-segmental feature.

4. The method of claim 2, further comprising:
comparing the voice candidate of the plurality of voice candidates with ground truth data comprising the speaker-dependent acoustic feature and the speaker-independent linguistic feature; and
refining the voice candidate based on a comparison between the third voice audio segment and the ground truth data.

5. The method of claim 1,
wherein the speaker-dependent acoustic feature comprises a short-term segmental feature corresponding to vocal tract characteristics, and
wherein the speaker-independent linguistic feature comprises a supra-segmental feature corresponding to acoustic properties over more than one segment.

6. The method of claim 1, further comprising:
selecting a voice candidate of the plurality of voice candidates for voice conversion.

7. The method of claim 1, wherein the database comprises a plurality of trained voice candidates.

8. The method of claim 1, further comprising:
generating a plurality of dubbed version audio files based on each of the plurality of voice candidates, respectively, wherein each of the plurality of dubbed version audio files comprises the level of the speaker-dependent acoustic feature and the level of the speaker-independent linguistic feature of its respective voice candidate.

9. A method of training a machine learning system comprising:
learning a forward mapping function and an inverse mapping function, wherein the forward mapping function comprises:
receiving, by a voice feature extractor, a first voice audio segment;
extracting, by the voice feature extractor, a speaker-dependent acoustic feature;
sending the speaker-dependent acoustic feature to a first speaker generator;
receiving, by the first speaker generator, a speaker-independent linguistic feature from an inverse mapping function;
generating, by the first speaker generator, a first plurality of voice candidates based on the speaker-dependent acoustic feature and the speaker-independent linguistic feature, wherein each of the first plurality of the voice candidates comprises a different level of the speaker-dependent acoustic feature of the first voice audio segment and a different level of the speaker-independent linguistic feature of the second voice audio segment; and
determining, by a first discriminator, whether there is a discrepancy between a level of the speaker-dependent acoustic feature associated with the first plurality of voice and the speaker-dependent acoustic feature, and
wherein the inverse mapping function comprises:
receiving, by the feature extractor, a second voice audio segment;
extracting, by the feature extractor, the speaker-independent linguistic feature;

sending the speaker-independent linguistic feature to a second voice candidate generator;
receiving, by the second voice candidate generator, the speaker-dependent acoustic feature from the forward mapping function;
generating, by the second voice candidate generator, a second plurality of voice candidates using the speaker-independent linguistic feature and the speaker-dependent acoustic feature, wherein each of the second plurality of voice candidates comprises a different level of the speaker-dependent acoustic feature of the first voice audio segment and a different level of the speaker-independent linguistic feature of the second voice audio segment; and
storing the second plurality of voice candidates in a database connected to the machine learning system.

10. The method of claim 9, wherein each of the second plurality of voice candidates includes a second language translated based on a first language, and wherein the method further comprises determining, by a second discriminator, whether there is a discrepancy between a level of the speak-independent acoustic feature associated with the second plurality of voice candidates and the speaker-independent linguistic feature.

11. The method of claim 9, further comprising:
determining, by the first discriminator, the level of the speaker-dependent acoustic feature associated with the first plurality of voice candidates and the speaker-dependent acoustic feature are not consistent;
providing first inconsistency information to the first voice candidate generator for refining the first plurality of voice candidates;
sending the first plurality of voice candidates to a third speaker generator;
generating a converted speaker-dependent acoustic feature; and
sending the converted speaker-dependent acoustic feature to the first voice candidate generator; and
determining, by the second discriminator, a level of the speaker-independent feature associated with the second plurality of voice candidates and the speaker-independent linguistic feature are not consistent;
providing second inconsistency information to the second voice candidate generator for refining the second plurality of voice candidates;
sending the second plurality of voice candidates to a fourth speaker generator;
generating a converted speaker-independent linguistic feature; and
sending the converted speaker-independent linguistic feature to the second voice candidate generator.

12. The method of claim 9, further comprising employing identity mapping loss for preserving identity-related features of each of the first and second voice audio segments.

13. A system comprising:
a machine learning system stored in memory of a server computer system and being implemented by at least one processor, the machine learning system being configured to execute instructions to perform operations comprising:
receiving a first voice audio segment and a second voice audio segment;
extracting a speaker-dependent acoustic feature from the first voice audio segment;
extracting a speaker-independent linguistic feature from the second voice audio segment;
generating a plurality of voice candidates, wherein each of the plurality of voice candidates comprises a different level of the speaker-dependent acoustic feature of the first voice audio segment and a different level of the speaker-independent linguistic feature of the second voice audio segment; and
storing the voice candidates in a database connected to the machine learning system.

14. The system of claim 13, wherein the operations further comprise:
generating a third voice audio segment based on a voice candidate from the plurality of voice candidates,
wherein the first voice audio segment is in a first language and the second voice audio segment is in a second language, and
wherein the third voice audio segment is in the second language translated based on the first language.

15. The system of claim 13,
wherein the speaker-dependent acoustic feature is based on a segmental feature, and
wherein the speaker-independent linguistic feature is based on a supra-segmental feature.

16. The system of claim 14, the operations further comprising:
comparing the voice candidate of the plurality of voice candidates with ground truth data comprising the speaker-dependent acoustic feature and the speaker-independent linguistic feature; and
refining the voice candidate based on a comparison between the third voice audio segment and the ground truth data.

17. The system of claim 13,
wherein the speaker-dependent acoustic feature comprises a short-term segmental feature corresponding to vocal tract characteristics, and
wherein the speaker-independent linguistic feature comprises a supra-segmental feature corresponding to acoustic properties over more than one segment.

* * * * *